Sept. 25, 1962  E. T. HALFORD  3,055,413
TOOL FOR STRAIGHTENING MILK CASES AND THE LIKE
Filed May 14, 1959

INVENTOR.
ERDEST T. HALFORD
BY John R. Walker, III
Attorney

United States Patent Office 3,055,413
Patented Sept. 25, 1962

3,055,413
TOOL FOR STRAIGHTENING MILK CASES
AND THE LIKE
Erdest T. Halford, 166 Yates Road, Memphis, Tenn.
Filed May 14, 1959, Ser. No. 813,259
5 Claims. (Cl. 153—32)

This invention relates to a tool for straightening milk cases and the like.

The tool of the present invention is particularly adapted for use in the milk industry, wherein, at the present time, a light wire case is used to carry the cardboard cartons of milk. These cases are damaged during handling and become easily bent. In these cases, there is very little tolerance between the cartons of milk and the inside of the case so that if the cases become bent into an out-of-square position; or if the wires thereof become bent inwardly, the cases cannot accommodate the cartons of milk and become useless unless they can be repaired. Also, the need for precisely aligned cases has become more important with the advent of automatic casing machines which will not function properly if the cases are not in exact repair. Thus, if a case is in an out-of-square position, the cartons cannot be inserted into the case by the machine or if forced into the case will cause the cartons to break and the milk to spill therefrom. Heretofore there has been no efficient and suitable way to repair cases and the practice, in general, is to discard the cases once they become damaged.

Thus, one of the important objects of the present invention is to provide a tool for quickly and efficiently straightening milk cases from an out-of-square position to a squared position.

A further object is to provide such a tool which includes a pair of retractable anvil halves for receiving the case thereon and means for moving the anvil halves apart to an exact squared disposition to perfectly straighten the cases.

A further object is to provide such a tool in which the head thereof is rotatable so that the tool head may be used as an anvil to hammer any bent wires into place.

A further object is to provide such a tool which is simple in construction, thereby being inexpensive to manufacture, yet which is highly efficient and effective.

A further object is to provide means for quickly and accurately adjusting the position of the anvil halves.

A further object is, generally, to improve the design and construction of tools for straightening milk cases and the like.

The means by which the foregoing and other objects of the present invention are accomplished and the manner of their accomplishment will be readily understood from the following specification upon reference to the accompanying drawings in which.

Figure 1:
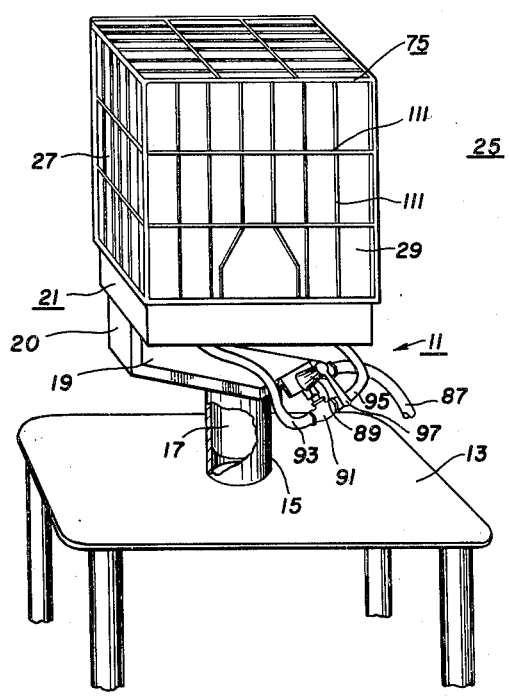
FIG. 1 is a fragmentary prospective view of the tool of the present invention with parts being broken away for purposes of clarity and with a milk case being shown in position on the tool head.

Referring now to the drawings in which the various parts are indicated by numerals, the tool 11 of the present invention includes a supporting structure, as a table 13. An upstanding hollow cylinder 15 is fixedly mounted on table 13 and has rotatably and removably received in the open upper end thereof a pipe 17. A bracket 19 is fixedly attached to pipe 17 and arranged so that the pipe depends from the bracket. Bracket 19 extends horizontally from pipe 17 and thence upwardly for a portion as at 20. At the upper end of the portion 20 of the bracket is fixedly mounted a first anvil half 21, and a second anvil half 23 is carried by the first anvil half, which anvil halves will be described in more detail in the description to follow. From the foregoing, it will be understood that the tool head 25 which includes first anvil half 21 and second anvil half 23 is rotatably supported from table 13 so that the tool head may be rotated 360 degrees in either direction. In addition, it will be understood that the upper end of cylinder 15 acts as a bearing surface for the lower surface of bracket 19.

Figure 2:
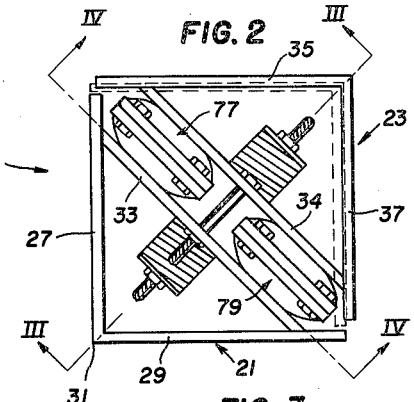
FIG. 2 is a top plan view of the tool head per se.
Figure 3:
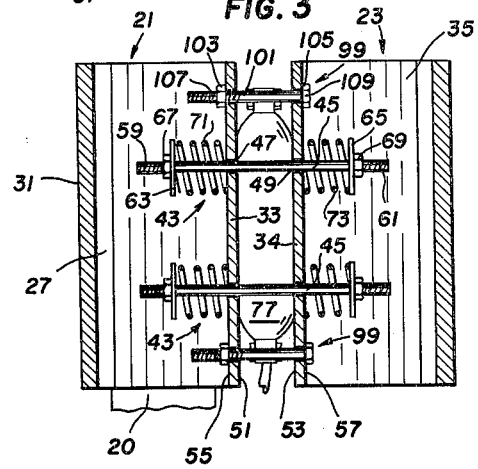
FIG. 3 is a fragmentary sectional view taken as on the line III—III of FIG. 2.

First anvil half 21 comprises a pair of substantially rectangular and flat vertical sides 27, 29. Sides 27, 29 are perpendicular to each other and are fixedly joined along an edge 31. First anvil half 21 additionally includes a vertical plate 33 disposed at an angle relative to sides 27, 29, which plate is respectively fixedly attached to the inner faces of the sides adjacent the opposite side edges of the vertical plate to form substantially a triangle as viewed from above, as best seen in FIG. 2. Sides 27, 29 preferably extend beyond the side edges of plate 33 for a short distance.

The construction of second anvil half 23 is similar to that above described for the first anvil half 21. Thus second anvil half 23 includes a vertical plate 34 disposed at an angle relative to a pair of perpendicularly disposed sides 35, 37, which plate is fixedly attached to the inner faces of the sides adjacent the opposite side edges of the vertical plate to form substantially a triangle as viewed from above, as best seen in FIG. 2. Also, sides 35, 37 preferably extend beyond the side edges of plate 34 for a short distance. Second anvil half 23 is so disposed relative to first anvil half 21 that plates 33, 34 are in parallel spaced relationship, and so that sides 27, 29, 35 and 37 form a substantially box-like exterior of tool head 25.

A pair of vertically spaced clamping devices 43 coact between anvil halves 21, 23. Clamping devices 43 are of substantially the same construction and the following description of one will suffice for both. Each of clamping devices 43 includes a horizontally disposed rod 45 which loosely extends through aligned apertures 47, 49 respectively provided in vertical plates 33, 34. For purposes of clarity, it should be noted here that when the term "front sides" of vertical plates 33, 34 is mentioned, it refers to the adjacent sides of the vertical plates designated as at 51, 53, respectively, and when the term "back sides" is mentioned, it refers to the remote sides of the vertical plates 33, 34, designated as at 55, 57, respectively. Rod 45 extends beyond back sides 55, 57 and is provided with threaded portions 59, 61 respectively adjacent the opposite ends of the rod. Washers 63, 65 are respectively provided on rod 45 adjacent the opposite end thereof and nuts 67, 69 are respectively threadedly engaged on threaded portions 59, 61 behind washers and to respectively act as seating means for the outer ends of a pair of springs 71, 73. Springs 71 extends between washer 63 and the back side 55, and spring 73 extends between washer 65 and the back side 57 so that second anvil half 23 is biased towards first anvil half 21 to urge the tool head 25 into a retracted position. In FIG. 2 the dotted line representation shows the position of sides 35, 37 when the tool head 25 is in said retracted position. The dimensions of tool head 25, when in said retracted position, are less than the inside dimensions of a case 75 which the tool 11 is adapted to straighten so that the case may be placed in an inverted position over the tool head 25 as best shown in FIG. 1.

Figure 4:
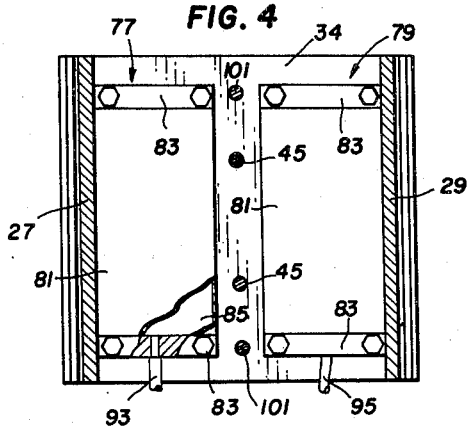
FIG. 4 is a sectional view taken as on the line IV—IV of FIG. 2 and with parts being broken away for purposes of clarity.
Figure 5:
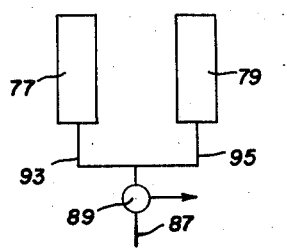
FIG. 5 is a schematic view of the bellows and fluid system of the present invention.

A pair of bellows 77, 79 are disposed between vertical plates 33, 34 in side by side relationship as best shown in FIG. 4. Each of bellows 77, 79 are of similar construction and each includes a substantially tubular body portion 81 formed of a fluid tight material as rubber or the like and is closed at either end thereof as by clamps 83 to form an enclosed air chamber 85 in the interior of body portion 81. Fluid pressure is introduced into bellows 77, 79 from a fluid supply, as an air supply not shown, through a flexible conduit 87, a valve 89 interposed in the conduit, a T-coupling 91 and thence through branch conduits 93, 95 which are communicated with the air chambers of bellows 77, 79, respectively. Valve 89 is of well-known construction and is of the type manually controlled by a handle 97 which is adapted to position the valve in a first position wherein the fluid supply, not shown, is communicated with bellows 77, 79 to apply fluid pressure in the bellows for the inflation thereof, and which is adapted to position the valve in a second position, wherein the fluid supply is cut off and the fluid in bellows 77, 79 is exhausted to the atmosphere to deflate the bellows. It will be understood that inflation of bellows 77, 79 will cause relative movement of anvil halves 21, 23 away from each other to expand tool head 25. It will be understood that the actual movement is made by second anvil half 23, which is carried by first anvil half 21, and which first anvil half is supported from table 13 by bracket 19.

A pair of stops 99 are provided to limit expansion of tool head 25 to stop the tool head in an expanded position best shown in solid lines, in FIG. 2, wherein it will be seen the outer faces of sides 27, 29, 35, 37 form a substantially right angular parallelogram when viewed from the top as in this figure. Each of stops 99 preferably comprises a bolt 101 loosely extending through aligned apertures 103, 105, respectively provided in plates 33, 34 with a nut 107 being threadedly engaged on bolt 101 on the back side of one of plates 33, 34 and with the head 109 of the bolt being disposed adjacent the back side of the other plate. Thus it will be understood that the bolt head 109 and nut 107 are respectively engaged by plates 33, 34 to limit outward movement of the second anvil half 23 relative the first anvil half 21. Additionally, it will be understood that by varying the position of nut 107 on bolt 101, the exact positioning of the anvil halves 21, 23 may be established for providing an exact right angular parallelogram. In the drawings, the right angular parallelogram is shown as a square, but it will be understood that the parallelogram may be a rectangle if the case to be used therewith is of such shape.

In the operation of the tool 11 of the present invention, valve 89 is placed in a position to exhaust fluid from bellows 77, 79 whereupon clamping devices 43 will cause inward movement of anvil halves 21, 23 until the tool head 25 is in the heretofore mentioned retracted position. Then case 75 is placed over the tool head 25 in an inverted position as shown in FIG. 1. Thence, the valve 89 is positioned to introduce fluid pressure into bellows 77, 79, whereupon the tool head 25 will expand to the expanded disposition shown in solid lines in FIG. 2. This expansion will cause any out-of-square case 75 to be warped back into a squared condition. Next, any of the wires 111 of the case 75 which are bent, may be bent back into shape by using a hammer. It will be understood that the sides 27, 29, 35 and 37 furnish an ideal anvil surface for this hammering and it will further be understood that since tool head 25 is rotatably mounted from table 13, the tool head may be rotated for quick and easy inspection and use of the hammer. After the straightening has been accomplished, the valve 89 is turned to a position to cut off the fluid supply and exhaust the fluid in bellows 77, 79 to the atmosphere so that the case may be removed from the tool head 25.

From the foregoing, it will be apparent that a quick, convenient and easy means is provided for inspecting, holding and straightening damaged cases with complete accuracy.

Figure 6:
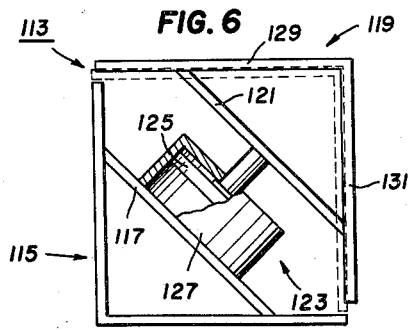
FIG. 6 is a top plan view similar to FIG. 2 of a modified construction of the tool head, and with parts being broken away for purposes of clarity.

In the modification of the present invention shown in FIG. 6, all of the parts thereof are substantially the same as the preferred embodiment heretofore described with the exception of the means for expanding and contracting the tool head. Thus, in the modification, the tool head 113 is provided with a first anvil half 115 similar to the construction of first anvil half 21 and including a vertical plate 117. Likewise, the second anvil half 119 of tool head 113 is similar in construction to second anvil half 23 and includes a vertical plate 121. However, due to the greater size of the moving means of the modified construction, plates 117, 121 are spaced farther apart than plates 33, 34 as best seen in FIG. 6.

In the modified construction, a fluid jack 123 of usual construction is provided between anvil halves 115, 119 and the jack includes a piston 125 slidably mounted in a cylinder 127. Fluid jack 123 is connected to a suitable fluid supply, as hydraulic fluid or the like, by suitable means well-known to those skilled in the art to selectively cause movement of piston 125 to carry tool head 113 into a retracted disposition in which the sides 129, 131 are moved into the position shown in dotted lines in FIG. 6, and to carry tool head 113 into an expanded disposition as shown in solid lines in this figure so that the tool head may be used for straightening milk cases and the like in the manner heretofore described for the preferred embodiment.

It will be understood that other details of the construction illustrated and described may be altered without departing from the spirit of the invention as defined by the following claims.

I claim:
1. A tool for straightening milk cases and the like comprising a table, a hollow cylinder mounted on said table and upstanding therefrom, a tool head including a first anvil half and a second anvil half movably supported from said first anvil half, a bracket fixedly attached to said first anvil half, a pipe fixedly attached to said bracket and depending therefrom, said pipe being removably and rotatably received in said cylinder whereby said tool head is removably and rotatably supported from said table, each of said anvil halves including a pair of flat perpendicularly disposed vertical sides joined together along an edge and a vertical plate disposed at an angle between said sides and attached thereto, said anvil halves being disposed with the plates thereof being in spaced and substantially parallel relationship, said plates being respectively provided with pairs of aligned apertures, at least one rod extending through a pair of said apertures and beyond the remote back sides of said plates, a pair of seating means adjustably mounted on said rod adjacent the opposite ends thereof, a pair of compression springs respectively mounted on said rod adjacent opposite ends thereof and respectively disposed between said pair of seating means and said back sides of said plates to urge said second anvil half towards said first anvil half into a retracted position of said tool head for receiving a milk case over said tool head, bellows disposed between said plates, fluid supply means coupled to said bellows for the inflation thereof under pressure to cause movement of said second anvil half way from said first anvil half, a bolt extending through another pair of said apertures and beyond the back sides of said plates, said bolt including a head, a nut threadedly engaged on said bolt, said bolt head being disposed adjacent the back side of one of said plates and said nut being disposed adjacent the back side of the other of said plates to limit movement of said sec- ond anvil half away from said first anvil half to stop said tool head in an expanded disposition in which the four sides of said anvil halves form a substantially right angle parallelogram for squaring up the sides of said milk case and for holding said milk case for shaping by hammering thereon, and valve means for relieving the fluid pressure on said bellows to permit said tool head to retract for removing said milk case.

2. A quick acting tool for straightening milk cases and the like compirsing a tool head including a first anvil half and a second anvil half, said anvil halves being quickly movable relative to one another, each of said anvil halves including a pair of flat perpendicularly disposed vertical sides joined together along an edge and a vertical plate disposed at an angle between said sides and attached thereto, said anvil halves being disposed with said plates thereof being in spaced and substantially parallel relationship, resilient means cooperating between said plates for urging said anvil halves towards one another into a retracted position for receiving said milk case over said tool head, bellows disposed between said plates, fluid supply means coupled to said bellows for the inflation thereof under pressure to cause quick relative movement of said anvil halves away from each other against said resilient means, means limiting outward movement of said anvil halves to stop said tool head in an expanded disposition, when in said expanded disposition said tool head establishing a substantially box-like configuration having a cross-section with the exterior thereof in the shape of a substantially complete right angle parallelogram approximating the inside shape of a squared milk case whereby the tool is adapted for squaring up the sides of said milk case and for holding said milk case for shaping by hammering thereon, and valve means for relieving the fluid pressure on said bellows to permit said tool head to retract for removing said milk case.

3. The structure according to claim 2 including a table and means for rotatably supporting said tool head from said table, whereby said tool head is adapted to be rotated for inspection of said case and for hammering thereon.

4. A quick acting tool for straightening milk cases and the like comprising a first anvil half, a second anvil half, said anvil halves being quickly movable relative to one another, each of said anvil halves including a pair of flat perpendicularly disposed vertical sides joined together along an edge, said anvil halves being arranged to establish a tool head with said side of said anvil halves forming a substantially box-like exterior of said tool head, resilient means cooperating between said anvil halves for urging said anvil halves towards one another into a retracted position for receiving said milk case over said tool head, bellows disposed between said plates, fluid supply means coupled to said bellows for the inflation thereof under pressure to cause relative movement of halves away from each other against said resilient means, means limiting outward movement of said anvil halves to stop said tool head in an expanded disposition, when in said expanded disposition said tool head establishing a substantially box-like configuration having a cross-section with the exterior thereof in the shape of a substantially complete right angle parallolgram approximating the inside shape of said squared milk case whereby the tool is adapted for squaring up the sides of said milk case and for holding said milk case for shaping by hammering thereon, and valve means for relieving the fluid pressure on said bellows to permit said tool head to retract for removing said milk case.

5. A tool for straightening milk cases and the like comprising a tool head including a first anvil half and a second anvil half, each of said anvil halves including a pair of flat perpendicularly disposed vertical sides joined together along an edge and a vertical plate disposed at an angle between said sides and attached thereto, said anvil halves being disposed with the plates thereof being in spaced and substantially parallel relationship, said plates being respectively provided with a pair of aligned apertures, at least one rod extending through a pair of said apertures and beyond the remote back sides of said plates, a pair of seating means adjustably mounted on said rod adjacent the opposite ends thereof, a pair of compression springs respectively mounted on said rod adjacent opposite ends thereof and respectively disposed between said pair of seating means and said back sides of said plates to urge said second anvil half towards said first anvil half into a retracted position of said tool head for receiving a milk case over said tool head, bellows disposed between said plates, fluid supply means coupled to said bellows for the inflation thereof under pressure to cause movement of said second anvil half away from said first anvil half, a bolt extending through another pair of said apertures and beyond the back sides of said plates, said bolt including a head, a nut threadedly engaged on said bolt, said bolt head being disposed adjacent the back side of the other of said plates to limit movement of said second anvil half away from said first anvil half to stop said tool head in an expanded disposition in which the four sides of said anvil halves form a substantially right angle parallelogram for squaring up the sides of said milk case and for holding said milk case for shaping by hammering thereon, and valve means for relieving the fluid pressure on said bellows to permit said tool head to retract for removing said milk case.

References Cited in the file of this patent
UNITED STATES PATENTS

| | | |
|---|---|---|
| 1,397,931 | Kurtz | Nov. 22, 1921 |
| 1,723,970 | Jauch | Aug. 6, 1929 |
| 2,461,839 | Neutelings | Feb. 15, 1949 |
| 2,474,887 | Carlswell et al. | July 5, 1949 |
| 2,804,118 | Bayerkohler | Aug. 27, 1957 |
| 2,931,416 | Krise | Apr. 5, 1960 |